United States Patent
Kwon et al.

(10) Patent No.: US 10,931,360 B2
(45) Date of Patent: Feb. 23, 2021

(54) SYSTEM AND METHOD FOR PROVIDING MULTIPLE INPUT MULTIPLE OUTPUT (MIMO) DETECTOR SELECTION WITH REINFORCED LEARNING NEURAL NETWORK

(71) Applicant: Samsung Electronics Co., Ltd., Gyeonggi-do (KR)

(72) Inventors: Hyukjoon Kwon, San Diego, CA (US); Kee-Bong Song, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/750,363

(22) Filed: Jan. 23, 2020

(65) Prior Publication Data

US 2020/0343962 A1 Oct. 29, 2020

Related U.S. Application Data

(60) Provisional application No. 62/837,499, filed on Apr. 23, 2019.

(51) Int. Cl.
*H04B 7/08* (2006.01)
*G06N 3/08* (2006.01)
*H04L 1/20* (2006.01)
*H04L 25/06* (2006.01)
*H04L 1/00* (2006.01)
*G06K 9/62* (2006.01)

(52) U.S. Cl.
CPC ......... *H04B 7/0854* (2013.01); *G06K 9/6262* (2013.01); *G06N 3/08* (2013.01); *H04L 1/005* (2013.01); *H04L 1/201* (2013.01); *H04L 25/067* (2013.01)

(58) Field of Classification Search
CPC ....... H04L 1/0054; H04L 1/005; H04L 1/201; H04L 25/067; H04B 7/0413; H04B 7/0854; G06K 9/6262; G06N 3/08
See application file for complete search history.

(56) References Cited

U.S. PATENT DOCUMENTS

2005/0190868 A1  9/2005  Khandekar et al.
2009/0147890 A1* 6/2009  Lee ..................... H04L 25/0204
                                                     375/341
(Continued)

FOREIGN PATENT DOCUMENTS

KR  1020120015272  2/2012
KR  1020170111595  10/2017

OTHER PUBLICATIONS

Volodymyr Mnih et al., "Playing Atari with Deep Reinforcement Learning", Dec. 19, 2013, 9 pages.
(Continued)

*Primary Examiner* — Sung S Ahn
(74) *Attorney, Agent, or Firm* — The Farrell Law Firm, P.C.

(57) ABSTRACT

A method and system for selecting a symbol detector are herein provided. A method includes extracting a first set of features for a k-th resource element (RE), where k is an integer greater than one, extracting a second set of features from a first RE to a (k−1)th RE, and selecting a symbol detector for the k-th RE using a reinforcement learning (RL) neural network based on the extracted first set of features and the extracted second set of features.

20 Claims, 7 Drawing Sheets

(56) References Cited

U.S. PATENT DOCUMENTS

2011/0188615 A1 8/2011 Yang et al.
2017/0126360 A1 5/2017 Millar et al.
2017/0238317 A1* 8/2017 Choi .................. H04L 25/0228
375/341

OTHER PUBLICATIONS

David Silver et al., "Deterministic Policy Gradient Algorithms", Proceedings of the 31st International Conference on Machine Learning, vol. 32, 2014, 9 pages.
George Konidaris et al., "Value Function Approximation in Reinforcement Learning Using the Fourier Basis", Aug. 2011, 6 pages.
Csaba Szepesvari, "Algorithms for Reinforcement Learning", Morgan and Claypool Publishers, 2010, 105 pages.
Richard S. Sutton et al., "Policy Gradient Methods for Reinforcement Learning with Function Approximation", 2000, 7 pages.
Vijay Konda et al., "Actor-Critic Algorithms", in Advances in Neural Information Processing Systems, 2000, 7 pages.

\* cited by examiner

SYSTEM AND METHOD FOR PROVIDING MULTIPLE INPUT MULTIPLE OUTPUT (MIMO) DETECTOR SELECTION WITH REINFORCED LEARNING NEURAL NETWORK

PRIORITY

This application is based on and claims priority under 35 U.S.C. § 119(e) to a U.S. Provisional Patent Application filed on Apr. 23, 2019 in the United States Patent and Trademark Office and assigned Ser. No. 62/837,499, and U.S. Patent Application filed on Jan. 23, 2020 in the United States Patent and Trademark Office and assigned application Ser. No. 16/750,363, the entire contents of which are incorporated herein by reference.

FIELD

The present disclosure generally relates to wireless communication systems. In particular, the present disclosure is related to a system and method for providing multiple input multiple output (MIMO) detector selection by with a reinforcement learning (RL) neural network.

BACKGROUND

In a wireless communication system (e.g., long term evolution (LTE), $5^{th}$ generation new radio (5G NR)), a MIMO symbol detector computes log-likelihood-ratios (LLRs) of the coded bits in MIMO layers. The LLRs may be determined using various types of detection methods. The complexities of such detection methods range from very high complexity (e.g., maximum likelihood (ML)) to low complexity (e.g., minimum mean square error (MMSE)). Typically, the performance of the detection method, measured in terms of an error rate, is inversely proportional to the complexity. Therefore, an ML has minimum error rate while an MMSE has maximum error rate.

Typically, one detector is used to obtain LLRs for all resource elements (REs) irrespective of channel conditions in the REs. When choosing to use such a static detector, there is a trade-off between complexity and error rate. If low error rate is desired, then a high complexity detector is used. On the other hand, if a low complexity detector is used, then the error rate increases.

SUMMARY

According to one embodiment, a method for selecting a symbol detector includes extracting a first set of features for a k-th RE, where k is an integer greater than one, extracting a second set of features from a first RE to a (k−1)th RE, and selecting a symbol detector for the k-th RE using a RL neural network based on the extracted first set of features and the extracted second set of features.

According to one embodiment, a system for selecting a symbol detector includes a memory and a processor configured to extract a first set of features for a k-th RE, where k is an integer greater than one, extract a second set of features from a first RE to a (k−1)th RE, and select a symbol detector for the k-th RE using a RL neural network based on the extracted first set of features and the extracted second set of features

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
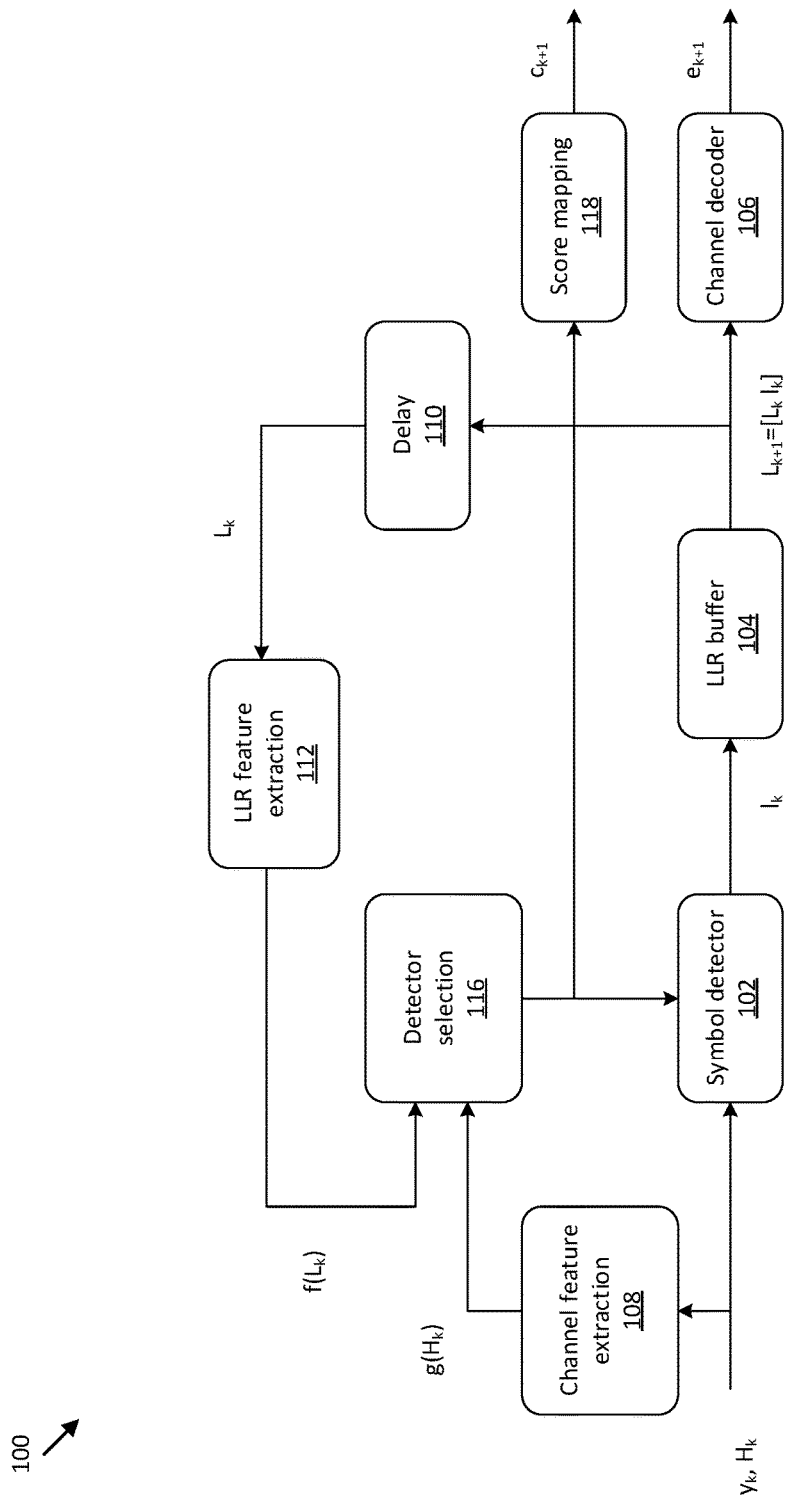
FIG. 1 illustrates a diagram of a system for Markov decision process (MDP) formulation with a symbol detector, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may be used interchangeably with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

A symbol detector block has relatively higher power consumption within a baseband modem. The level of power consumption of a symbol detector increases as a modulation order or the number of layers increases. A symbol detector may operates per RE. Due to the high usage frequency of a symbol detector, it is desirable to reduce power consumption of the symbol detector and utilize the full speed supported in 5G.

In a fading channel, channels fluctuate over both time and frequency. Such a fluctuation implies that an RE may require a less power intensive symbol detector at a relatively good channel and a more power intensive symbol detector at a relatively bad channel. The present system and method includes a learning process to select a desired symbol detector for each RE.

With Q-learning, the observation of channel and signals is converted into states and the detector decisions are considered as actions. The complexity or equivalent power consumption of each detector is reflected to the reward with the decoding result that is affected by all the decisions of all REs.

Q-values are refined over the back-and-forth updates. The parameter to give a constraint to error rates is adjusted by following intermediate results over two worlds. Simulation results show that the disclosed formulation with RL is effective in terms of both block error rate (BLER) and detection utilization.

The present system and method moves both pre-processing and post-processing into the RL-based mode selection as adding the feedback path that the past decision is reflected to the current status. As a result, it is expected that the algorithm itself could handle the processing of MLP-based scheme automatically. This approach enables the RL-based scheme to be human-independent and to resolve the problem on its own algorithm.

The present system and method provides RL formulation without using heuristic manipulation of samples, power saving by using the least complex detector as much as possible, and a data-driven simulator supporting the 5G specification, according to one embodiment.

In wireless systems, the baseband receiver includes a channel estimator, a symbol detector, and a channel decoder. Among these elements, the symbol detector mainly operates with two variables, the received signal, $y_k$, and the estimated channel elements, $H_k$, at the kth RE where k=1 . . . K. Without loss of generality, it is assumed that the number of layers is the same as the number of transmit antennas, and the noise is already whitened before signals are conveyed to the symbol detector.

The purpose of the symbol detector is to generate log likelihood ratios (LLRs) for each bit corresponding to a modulated symbol, which are forwarded to the channel decoder. There are many symbol detectors, each producing different qualities of LLRs under different levels of complexity. The present system and method provides an algorithm that recommends the lowest complexity detector such that the quality of LLRs are good enough to be decoded correctly.

FIG. 1 illustrates a diagram of a system 100 for MDP formulation with a symbol detector, according to an embodiment. The system 100 includes a symbol detector 102, a LLR buffer 104, a channel decoder 106, a channel feature extraction block 108, a delay 110, and a LLR feature extraction block 112, a detector selection block 116, and a score mapping block 118. The detector selection block 116 is where the detector level is decided (e.g., whether the minimum mean square estimation (MMSE) detector is simply enough or the maximum likelihood (ML) detector is needed to detect signals at the kth RE). As being formulated by RL and taking and input (i.e., the channel and LLR), a deep network decides which detector is proper (i.e., enough to contribute the successful decoding as well as enough to reduce the complexity). The detector selection block 116 targets to achieve the performance as close as that of ML (the most complexity detector) while to achieve the complexity as close as that of MMSE (the least complexity detector). Both detectors are examples of the least and the most complicated detectors, respectively. It is understood that more detector levels may be utilized. The detector selection block 116 receives one or more channel features from the channel feature extraction block 108 and one or more LLR features from the LLR feature extraction block 112. The channel feature extraction block 108 extracts channel features to represent the current channel quality at the kth RE. The LLR feature extraction block 112 extracts LLR features to represent the past channel quality up to (k−1)th RE. The latter is expressed with the LLR values that were already generated and stored in the LLR buffer 104. For example, if all the previous REs select ML detectors such that the LLR qualities are high enough, then a current RE would have a high chance to select a low-complexity detector as expecting the decoder gain to compensate a single bit error.

Given the kth RE, both channel and LLR features are extracted from $H_k$ and $L_k$. The state $s_k$ include these two features. The channel features represent how good an instantaneous channel of $H_k$ is. It is possible to use $y_k$ in addition to $H_k$ to extract channel features. The LLR features are designed to reflect which actions have been decided up to the (k−1)th RE. The LLR information $L_k$ is a set of LLRs for all layers, being concatenated from the $1^{st}$ RE to the (k−1)th RE, and is expressed as $L_{k+1}=[L_k, l_k]$, where $l_k$ is the LLR generated from the detector selected at the kth RE. $L_k$ is initialized with an empty set. Across all REs in a TB, each state includes a set of states, S, which denotes all possible realizations of $s_k$ for k 1, . . . , K.

The detector selection block 116 output is converted to a complexity score, $c_{k+1}$, at the score mapping block 118. The low complexity detector (e.g., MMSE) is mapped with a higher score and the high complexity detector (e.g., ML) is mapped with a lower score. It is beneficial to select a low-complexity detector to maximize the sum of rewards, $r_{k+1}$, as long as the decoding result from the channel decoder 106, $e_{k+1}$, passes a cyclic redundancy check (CRC) defined as in Equation (1).

$$e_{k+1} = \begin{cases} 1, & \text{The decoding fails at } k = T - 1. \\ 0, & \text{otherwise.} \end{cases} \quad (1)$$

As described herein, a conventional index notation between state, action and reward is utilized such that state $s_k$ and action $a_k$ generate a reward $r_{k+1}$, not $r_k$, for the kth RE.

Figure 2:
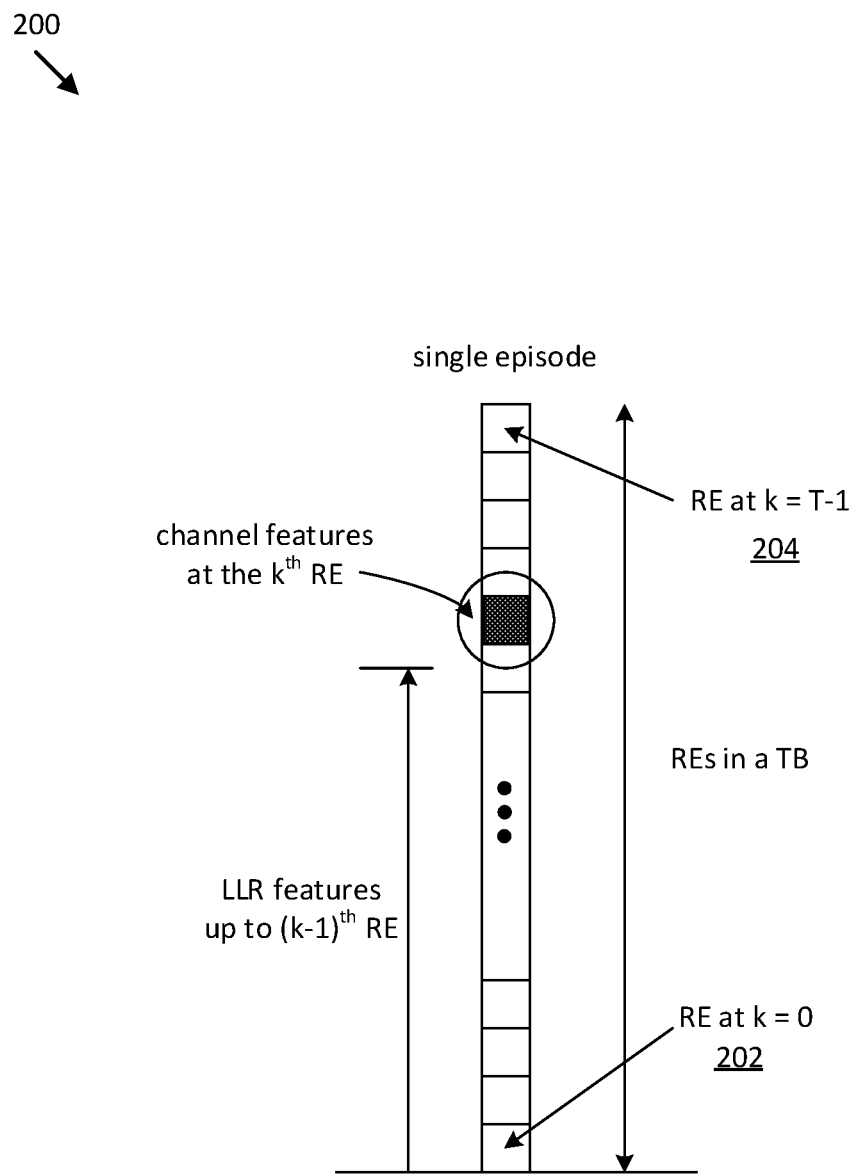
FIG. 2 illustrates a diagram of a single episode corresponding to a single transport block (TB), according to an embodiment.

FIG. 2 illustrates a diagram of a single episode 200 corresponding to a single TB, according to an embodiment. The formulation of Equation (1) can be abstracted with terms used in the context of RL. An episode is defined as a game to explore all REs associated with a single TB. Starting from the initial RE 202, the detector selection block 116 determines the type of detector (i.e., action $a_k$) and the episode is over at (T−1)th RE 204. Two distinguished properties are used to represent the current and past features with include the state $s_k$ at the kth RE. A total of eight features are defined, including three for channel features and five for LLR features.

Figure 3:
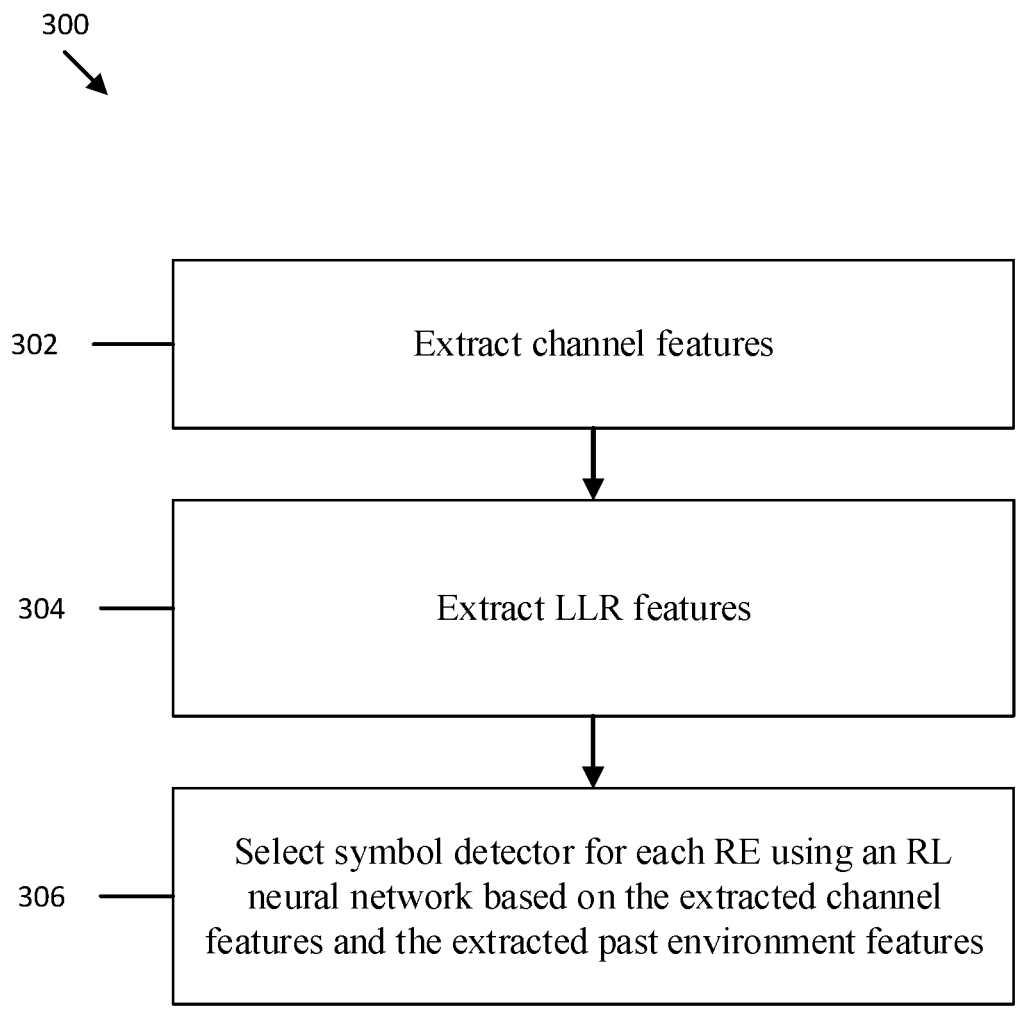
FIG. 3 illustrates a flowchart for detector selection using an RL neural network, according to an embodiment.

FIG. 3 illustrates a flowchart 300 for detector selection using a RL neural network, according to an embodiment. At 302, the system extracts channel features representing the current environment. The system may extract channel features from channel matrices in REs. The channel features include diagonal-to-on-diagonal channel power ratio, condition number, and total channel power (i.e., frobenius norm) using $H_k$ only.

At 304, the system extracts LLR features. The system may extract LLR features using accumulated LLRs up to a previous RE. The LLR features are generated using the LLR buffer 104's output $L_k$ and include a normalized RE location (k/T∼[0,1]), absolute values of LLR distributions, mean $\mu_{|L_k|}$, standard deviation $\sigma_{|L_k|}$, and soft symbol distribution. The LLR features are represented by Equation (2):

$$f_1 = \frac{k}{T} \quad (2)$$

$$f_2 = \frac{1}{kM_b}\sum_{m=0}^{k-1}\sum_{i=1}^{M_b}|L_m(i)|$$

$$f_3 = \sqrt{\frac{1}{kM_b}\sum_{m=0}^{k-1}\sum_{i=1}^{M_b}|L_m(i)|^2 - f_2^2}$$

$$f_4 = \frac{1}{k}\sum_{m=0}^{k-1} p_{k,l(k)^*}$$

$$f_5 = \sqrt{\frac{1}{k}\sum_{m=0}^{k-1} p_{k,l(k)^*}^2 - f_4^2}$$

where $f_1$ corresponds to the relative RE location within a TB to be decoded together, $f_2$ and $f_3$ correspond to the mean and standard deviation values of LLR features from past REs, and $f_4$ and $f_5$ correspond to the soft symbol distribution on the constellation map at the past REs with its mean/ standard deviation.

For the soft symbol distribution, using LLRs, $L_k$, it is possible to calculate the symbol probability for each constellation point. The symbol probability for the kth RE and lth layer is defined as in Equation (3):

$$p_{k,l} = \prod_{m=1}^{M} \frac{1}{2}\left(1 + b_{k,l}(m)\tanh\left(\frac{l_{k,l(m)}}{2}\right)\right) \quad (3)$$

where $b_k(m)$ is the mth bipolar bit. Then, the mean and standard deviation of $p_{k,l^*}$ is used where, as in Equation (4):

$$p_{k,l^*} = \max_{l=1,\ldots,N_l} p_{1:k-1,l} \quad (4)$$

and the subscript 1: k−1 denotes the indices from 1 to k−1. The assignment of scores to detectors is the policy $\pi_\theta$ to govern state $s_k$ and action $a_k$ under the score distribution∼θ. Then, the reward $r_{k+1}$ corresponds to the sum of the complexity score and decoding penalty in a single episode.

At 306, the system selects a symbol detector for each RE using an RL neural network based on the extracted channel features and the extracted past environment features. The disclosed approach is mathematically formulated with an optimization problem to maximize a total of complexity scores subject to the constraint that error rates should be maintained properly. This is expressed as Equation (5):

$$\text{maximize } J(\pi_\theta) = E_{\tau \sim \pi_\theta}\left(\frac{1}{T}\sum_{k=0}^{T-1} c_{k+1}\right) \quad (5)$$

$$\text{subject to } E_\tau(e_T) - E_{\tau,ML}(e_{T,ML}) \leq \epsilon$$

where $e_T$ is a binary event to indicate whether decoding fails at k=T−1. $e_{T,ML}$ is the error event when the most complex detector, ML, is used at the same episode. The random variable T denotes the trajectory of games to represent state action evolution under the policy $\pi_\theta$. Likewise, $\tau_{ML}$ represents the trajectory of games for the detector ML at the same episode. The outcome of the decoding results is only available at the last RE per episode. In other words, $e_k$ where k<T does not contribute to rewards or constraints, but rather to $e_T$. To solve Equation (5), the Lagrange multiplier μ is introduced to set up the Lagrange function as in Equation (6).

$$L(\mu,\pi)=J(\pi_\theta)-\mu(E_\tau(e_T)-E_{\tau,ML}(E_{T,ML})-\epsilon) \quad (6)$$

In detail, the Lagrange function is developed into Equation (7):

$$\pi^* = \underset{\pi}{\arg\max}\, L(\mu, \pi) \quad (7)$$

$$= \underset{\pi}{\arg\max} E_{\tau\sim\pi_\theta}\left(\frac{1}{T}\sum_{k=0}^{T-1} c_{k+1} - \mu e_T\right) + \mu(E_{\tau,ML}(e_{T,ML}))$$

$$\overset{(a)}{=} \underset{\pi}{\arg\max} E_{\tau\sim\pi_\theta}\left(\frac{1}{T}\sum_{k=0}^{T-1} c_{k+1} - \mu e_{k+1}\right)$$

$$\overset{(b)}{=} \underset{\pi}{\arg\max} E_{\tau\sim\pi_\theta}\left(\frac{1}{T}\sum_{k=0}^{T-1} r_{k+1}\right)$$

where (a) is derived from the fact that $E_{\tau,ML}(e_{T,ML})$ is independent of π and $e_k$=0 if k<T. (b) states that the reward for the disclosed game is now defined with both complexity scores and a decoding result where the decoding failure is punished with its penalty parameter (e.g., the Lagrange multiplier π), When enabling a policy network with a value network, $\pi_\theta$ is updated to adjust the mapping of complexity score to detectors by using several techniques (e.g., policy-gradient and actor-critic algorithms). When enabling the value network only, the complexity score rule is not changed while maximizing the expected return by adjusting θ from Q-learning via a deep Q-network (DQN). Algorithm 1 is provided in Table 1.

TABLE 1

Algorithm 1 MIMO mode selection with RL procedure
  initialize μ > 0
  while $P_{e,RL} \geq P_{e,ML} + \epsilon$ do
    Given μ, find the optimal policy and its parameters
  $\pi_\theta^* = \arg\max_\pi L(\mu,\pi)$ Given $\pi_\theta^*$, compute $\dfrac{\partial L(\mu,\pi)}{\partial \mu} = -(P_{e,RL} - P_{e,ML} - \epsilon)$ Update the penalty parameter, $\mu \leftarrow \mu - \alpha \dfrac{\partial L(\mu,\pi)}{\partial \mu}$ end while
  return $\pi_\theta^*$ and μ
end procedure As shown in Algorithm 1, the iteration is repeated until the error rate from the algorithm is reliable enough compared to one from the ML. To minimize the sensitivity of error rates, simulation has been performed with Equation (8):

$$\frac{1}{16}\log_{10}\left(\frac{P_{e,RL}}{P_{e,ML}}\right) \quad (8)$$

Equation (8) may be used instead of Equation (9):

$$P_{e,RL}-P_{e,ML} \quad (9)$$

where the number 1/16 and a logarithm function have been chosen via empirical experience. It is understood that any other metrics to determine whether the algorithm outcome is reliable may be utilized.

The MIMO mode may be selected based on deep learning (DL) techniques. MIMO mode selection using an MLP may use channel features. In other words, the system 100 of FIG. 1 may be used without feedback paths from the LLR buffer 104.

For offline training, channel features are generated from each of $H_k$ with proper labels. The MLP training has no concept of episodes so that $H_k$ could be arbitrarily selected over all samples. The MLP network is trained to produce the policy as in Equation (10).

$$\pi\theta(a_k|s_k)=P(a=a_k|s=s_k,\theta) \quad (10)$$

The policy is refined with post-processing that computes a margin between $P(a=a_i|s=s_k, \theta)$ and $P(a=a_j|s=s_k, \theta)$ where j=i+1, and relabels the detector type to ensure reliable error rates. The updated label is re-trained iteratively.

The online procedure is simple such that a channel feature for $H_k$ is forward-propagated over the trained MLP network. Then, the best action is chosen as in Equation (11) which should correspond to the lowest-complexity but reliable enough detector.

$$a^* = \underset{a}{\arg\max}\, \pi_\theta(a \mid s_k) \quad (11)$$

Figure 4:
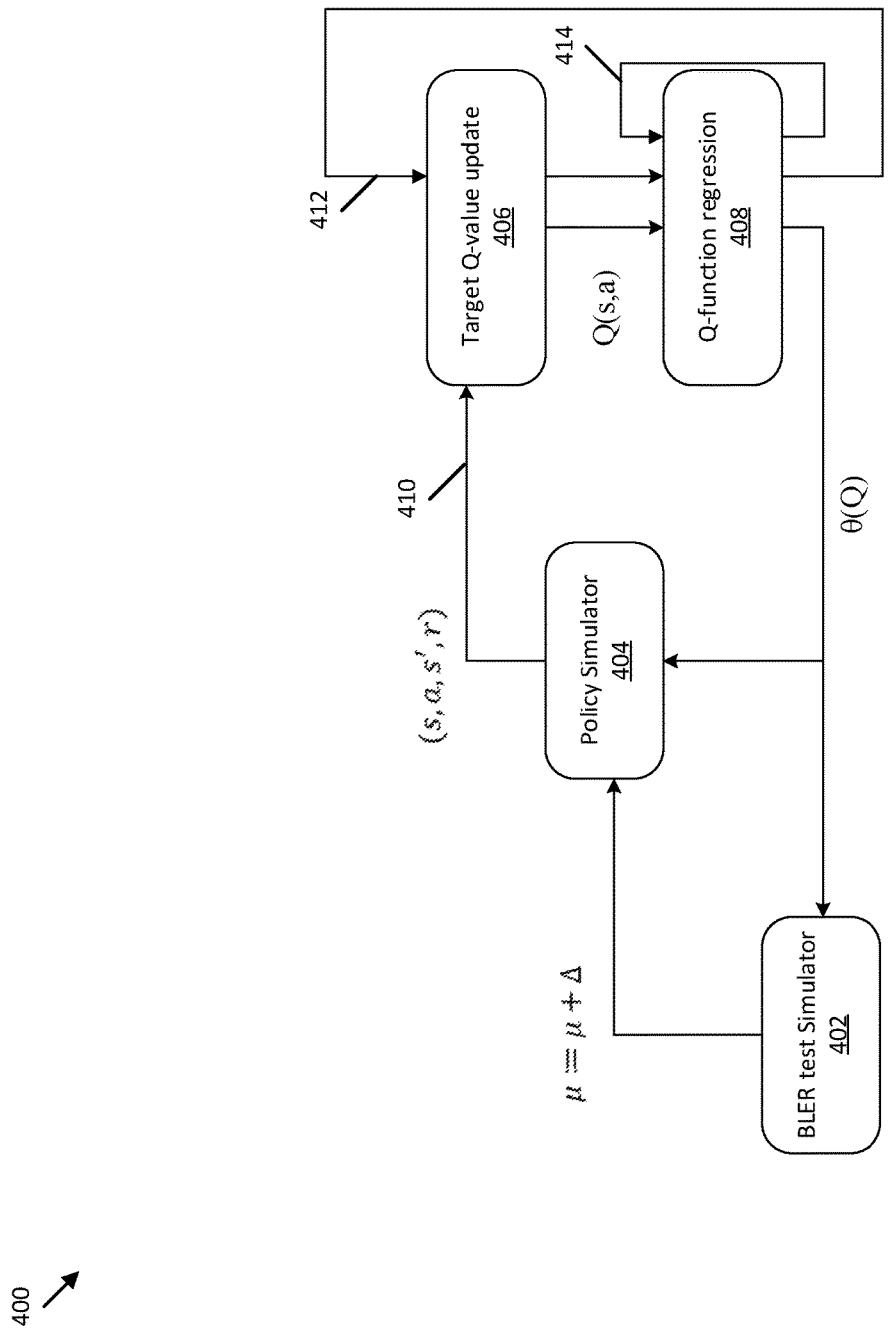
FIG. 4 illustrates a diagram of an RL procedure associated with a simulator, according to one embodiment.

FIG. 4 illustrates a diagram of an RL procedure associated with a simulator, according to one embodiment. RL may be performed between environment and agents for MIMO mode selection. Algorithm 2 provided in Table 2 restates Algorithm 1 in terms of interactions between a simulator and a neural network. In Table 2, the first "for" loop corresponds to loop 410, the second "for" loop corresponds to loop 412, and the third "for" loop corresponds to loop 414.

TABLE 2

Algorithm 2 Interaction of simulator and neural network procedure
  initialize μ > 0
  for n ≤ $N_{max}$ do
    Simulator run episodes to collect $(s_n,a_n,s'_n,r_n)$ by
    if n == 1 then
      using MLP network in Sec. 3.
    else
      using $\theta(Q_{n-1}^*)$ with ε-greedy.
    end if
    for k ≤ $K_{max}$ do
      Q-value is maximized with off-line samples,
  $Q(s_{n,k}, a_{n,k})$
      Q-learning builds a deep Q-network using
  samples from a replay buffer.
      for m ≤ $M_{max}$ do
        Q-function regression is performed to
  enhance the estimation in parallel.
        end for
    end for
    $\theta(Q_n^*)$ is generated to select the action, $a_{n,k}^*$, for the next round.
      Update $\mu \leftarrow \mu + \Delta$
  end for
end procedure The RL system 400 includes a block error rate (BLER) simulator block 402 to test the RL BLER, a policy simulator block 404 that generates policies, a target Q-value update block 406, and a Q-function regression block 408. The simulator 404 collects samples with a quadruple of their states/actions/rewards, (s, a, s', r), as following the trajectory per episode. To help states guided for their exploration, the present system and method uses channel features only at the first round. Then, the collected samples form a replay buffer and are refined to maximize the expected future reward using off-policy Q-network. To improve the policy, Q-learning is performed at blocks 406 and 408 using the refined samples and with their mapping of states and actions to rewards. These steps are repeated until Q-values are reliable enough under the current decoding penalty. Then, the decoding penalty parameter, μ, is updated so that samples are re-generated under the updated penalty and are fed into the replay buffer.

The disclosed algorithm includes two iterations. The first iteration, referred to as the outer iteration, is for θ(Q) that is used to collect samples with new decoding penalty parameter, and is iterated up to N max. The second iteration, referred to as the inner iteration, is for Q-learning to refine sample qualities and is iterated up to K max. In addition, although it is not a serial iteration, Q-learning estimation is improved with a parallel iteration up to M max.

As usual, an RL algorithm starts with the questions of how to collect samples at 404 as a form of their quadruple, (s, a, s', r), and when to update the expected future average reward (i.e., Q(s, a)). Too frequent updates of Q-values using samples per episode or samples within episodes close enough to each other are not encouraged due to correlation embedded in those samples. Minimizing correlation among the samples extracted from a big buffer has been achieved and is referred to as a replay buffer or a dataset of transitions.

Both serial and parallel jobs are performed to update RL results and to collect samples, respectively. The Q-network includes target Q-value updates 406 and Q-function regression 408, both of which are iteratively performed in a serial manner. The regression itself is carried with its own iteration to ensure a proper level of mean-square-error (MSE) for the estimation. The guided decision generates initial Q-values as in Equation (12).

$$Q(s_k, a_k) = \sum_{k'=k}^{T-1} r_{k'+1} \tag{12}$$

Q-learning based decision relies on Q(s, a) estimated from the regression at each moment. Thus, it is important for Q(s, a) to get trained with the number of samples that is enough to explore all states. For example, given a state $s_k$, even if action $a_i$ has been selected mostly in the training, it is needed to experience a different $a_j$. Otherwise, $Q(s_k, a_j)$ would be undefined or be estimated unreliably compared to $Q(s_k, a_j)$, which can cause unexpected behavior. Hence, an E-greedy algorithm is crucial in giving a chance to visit unexpected actions at the training and ensuring the estimated $Q(s_k, a_j)$ is small.

Under an E-greedy decision, Q-values are generated as in Equation (13).

$$Q(s_k, a_k) = E(r_{k+1}) + E_{\tau \sim \pi}\left(\sum_{k'=k+1}^{T-1} r_{k'+1}\right) \tag{13}$$

$$= \begin{cases} r_T, & k = T-1. \\ r_{k+1} + \max_{a'} Q(s_{k+1}, a'), & \text{otherwise.} \end{cases}$$

The max operator is exploited with the same Q-value to select and to evaluate an action. This causes a chance to select overestimated values and results in upward bias. Alternatively, the selection and the evaluation is separated by using different Q-values, called double Q-learning or double DQN. In other words, the current Q-network Q(s, a) is used to select actions, and the older Q-network Q'(s, a) is used to evaluate actions. Thus, Equation (13) is updated to Equation (14).

$$Q(s_k, a_k) \approx r_{k+1} + Q\left(s_{k+1}, \mathrm{argmax}_{a'} Q'(s_{k+1}, a')\right) \tag{14}$$

The updated Q(s, a) is trained over MLP network with multiple network initializations. The network initialization could be either the Q-value parameter at the previous outer iteration, the Q-value parameter at the previous inner iteration, or random inputs from Xavier's method. If the network initialization exists, it is used as initial parameters for training. Random inputs from Xavier's method are also exploited to explore different initializations.

The exit condition is defined as $\mathrm{MSE}_m = \min(\mathrm{MSE}_{1:m-1})$ and m>Mth, or m=M max. This condition ensures the estimated MSE is reliable enough, and at least expect the network to be fully utilized given the number of nodes. The MSE is calculated as in Equation (15):

$$MSE = \sqrt{\frac{1}{N_a} \sum_{i=0}^{N_a-1} (Q_i - \tilde{Q}_i)^2} \tag{15}$$

where $\overline{Q}_i$ is the estimated Q-value for the ith sample.

Figure 5:
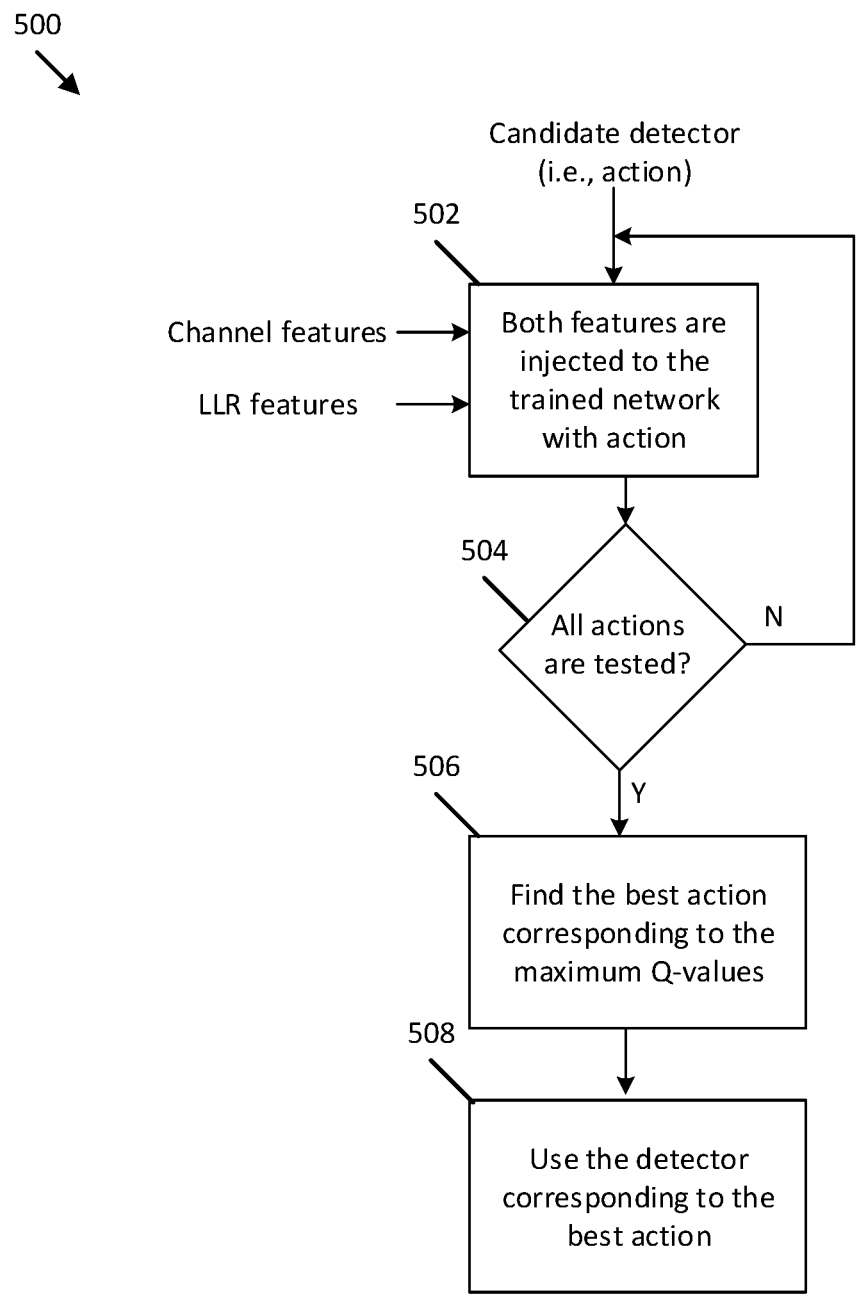
FIG. 5 illustrates a flowchart for detector selection, according to one embodiment.

FIG. 5 illustrates a flowchart 500 for detector selection, according to one embodiment. At 502, the system injects the channel features and the LLR features to the trained network with actions. At 504, the system determines whether all actions are tested. If all the actions are not tested, then the system repeats to 502. If all actions are tested, at 506, the system finds the best action corresponding to the maximum Q-values. At 508, the system uses the detector corresponding to the best action.

Figure 6:
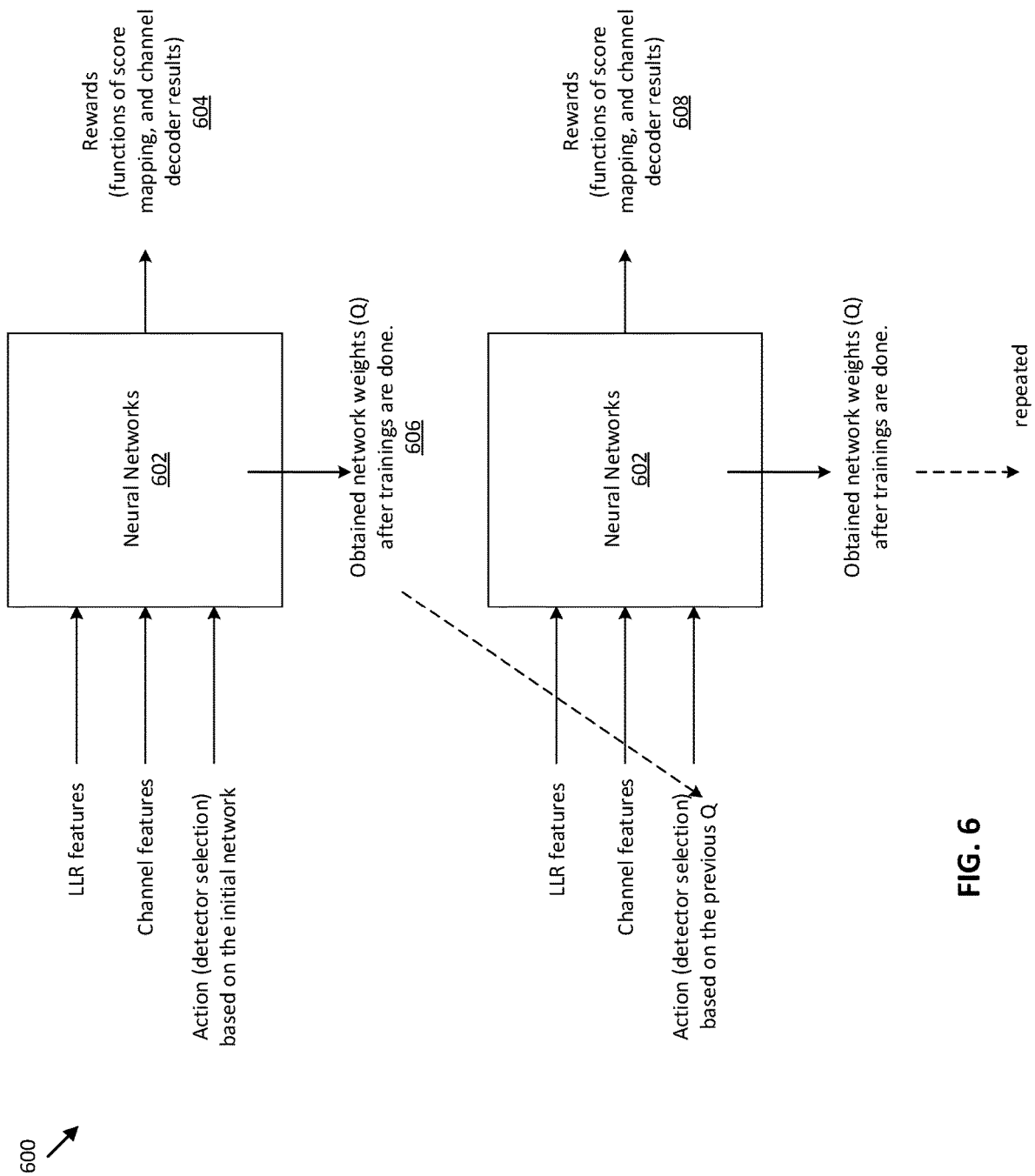
FIG. 6 illustrates a diagram of a system for detector selection, according to one embodiment.

FIG. 6 illustrates a diagram of a system for detector selection, according to one embodiment. The system 600 injects LLR features, channel features and an action based on an initial neural network into additional neural networks 602. The system 600 produces rewards 604 and obtains network weights (Q) 606 after trainings on the neural networks 602 are completed. The system 600 then injects LLR features, channel features, and an action based on the previous Q 606 into the neural networks 602. The system 600 produces rewards 608 and repeats the process.

Figure 7:
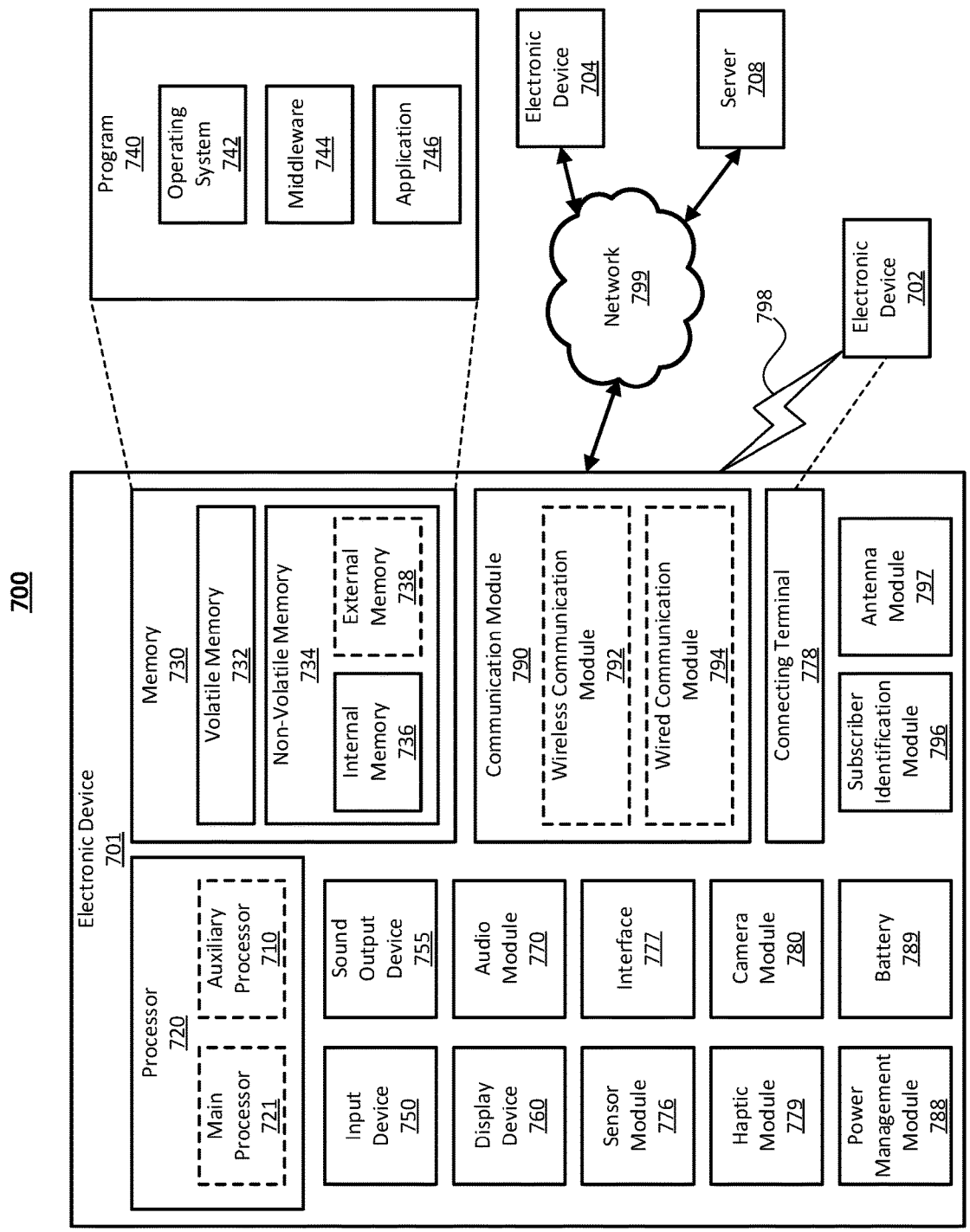
FIG. 7 illustrates a block diagram of an electronic device in a network environment, according to an embodiment.

FIG. 7 illustrates a block diagram of an electronic device 701 in a network environment 700, according to one embodiment. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 710 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 710 may be adapted to consume less power than the main processor 721, or execute a particular function. The auxiliary processor 710 may be implemented as being separate from, or a part of, the main processor 721.

The auxiliary processor 710 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 710 (e.g., an ISP or a CP) may be implemented as part of another component (e.g., the camera module 780 or the communication module 790) functionally related to the auxiliary processor 710.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store®), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for selecting a symbol detector, comprising:
    extracting a first set of features for a k-th resource element (RE), where k is an integer greater than one;
    extracting a second set of features from a first RE to a (k−1)th RE; and
    selecting a symbol detector for the k-th RE using a reinforcement learning (RL) neural network based on the extracted first set of features and the extracted second set of features.

2. The method of claim 1, wherein the first set of features are based on a channel matrix for the k-th RE.

3. The method of claim 1, wherein the second set of features are based on accumulated log likelihood ratios (LLR).

4. The method of claim 1, wherein the second set of features include a normalized location, absolute values of log likelihood ratio (LLR) distributions or soft symbol distribution.

5. The method of claim 1, wherein the RL neural network includes a multi-layer perceptron (MLP).

6. The method of claim 1, wherein the RL neural network generates a complexity score corresponding to a complexity of the symbol detector.

7. The method of claim 6, wherein the symbol detector is selected based on the generated complexity score.

8. The method of claim 1, wherein the RL neural network generates a decoding penalty indicating whether decoding will be successful.

9. The method of claim 8, wherein the decoding penalty is based on a Lagrange multiplier penalty parameter.

10. The method of claim 1, wherein the RL neural network is trained using a deep Q-network (DQN).

11. A system for selecting a symbol detector, comprising:
    a memory; and
    a processor configured to:
        extract a first set of features for a k-th resource element (RE), where k is an integer greater than one;
        extract a second set of features from a first RE to a (k−1)th RE; and
        select a symbol detector for the k-th RE using a reinforcement learning (RL) neural network based on the extracted first set of features and the extracted second set of features.

12. The system of claim 11, wherein the first set of features are based on a channel matrix for the k-th RE.

13. The system of claim 11, wherein the second set of features are based on accumulated log likelihood rations (LLR).

14. The system of claim 11, wherein the second set of features include a normalized location, absolute values of log likelihood ratio (LLR) distributions or soft symbol distribution.

15. The system of claim 11, wherein the RL neural network includes a multi-layer perceptron (MLP).

16. The system of claim 11, wherein the RL neural network generates a complexity score corresponding to a complexity of the symbol detector.

17. The system of claim 16, wherein the symbol detector is selected based on the generated complexity score.

18. The system of claim 11, wherein the RL neural network generates a decoding penalty indicating whether decoding will be successful.

19. The system of claim 18, wherein the decoding penalty is based on a Lagrange multiplier penalty parameter.

20. The system of claim 11, wherein the RL neural network is trained using a deep Q-network (DQN).

* * * * *